April 14, 1953  C. P. DAVEY  2,634,912
SLIDE RULE INDICATOR
Filed May 1, 1951  2 SHEETS—SHEET 1
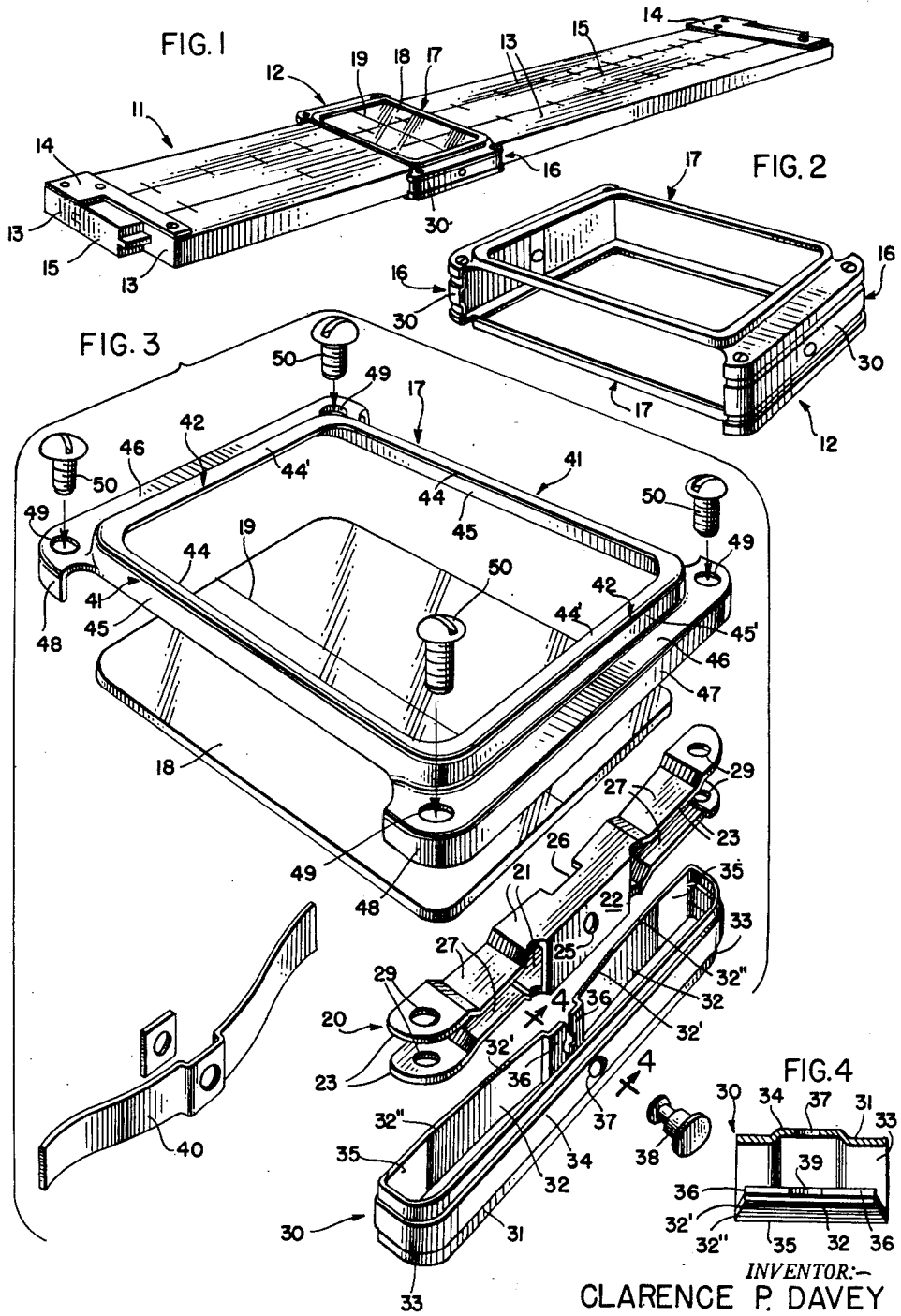
INVENTOR:—
CLARENCE P. DAVEY
BY:—
Spencer, Johnston, Cook & Root
ATT'YS

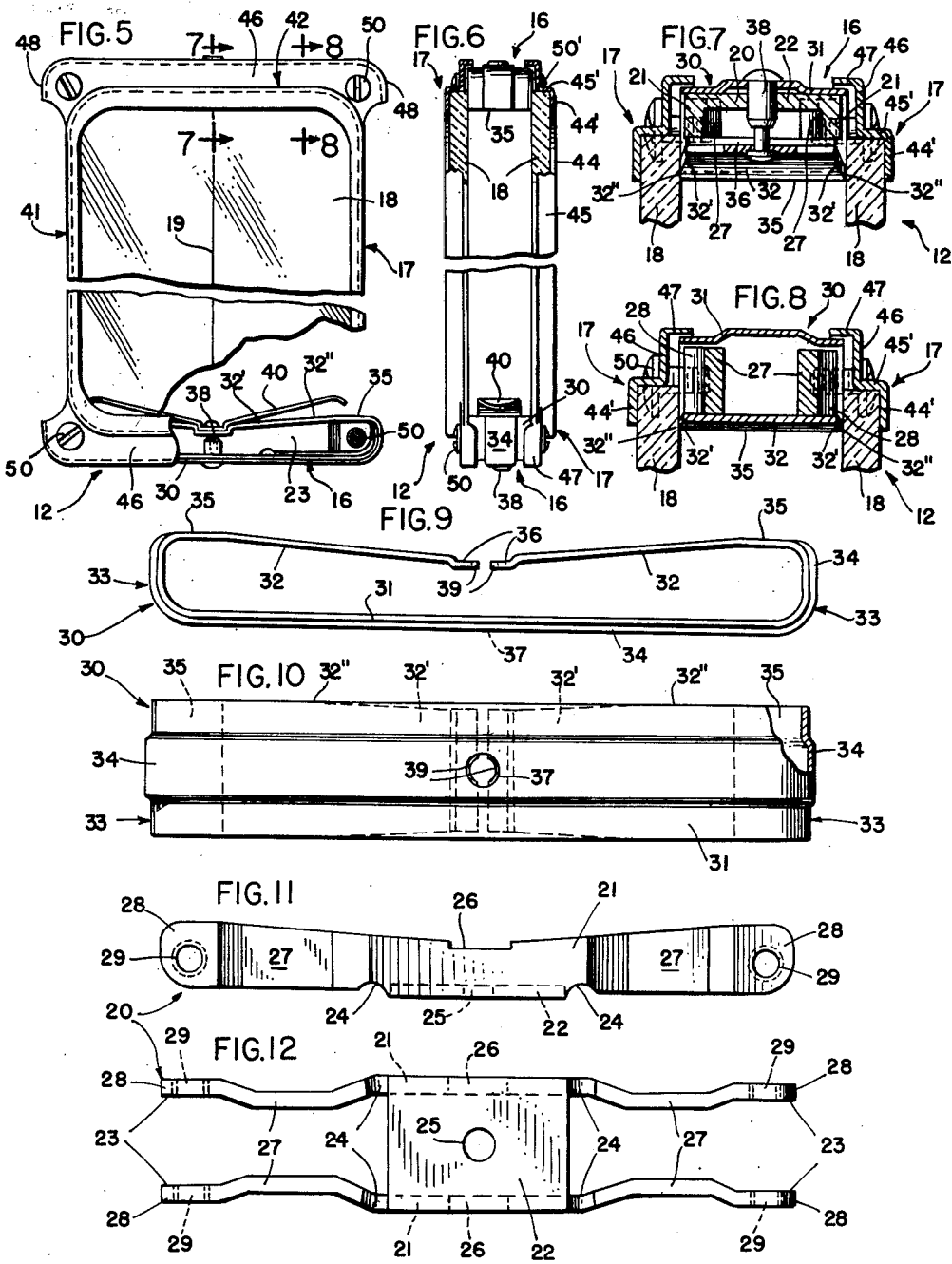
April 14, 1953 — C. P. DAVEY — 2,634,912
SLIDE RULE INDICATOR
Filed May 1, 1951 — 2 SHEETS—SHEET 2
INVENTOR:—
CLARENCE P. DAVEY
BY:—
Spencer, Johnston, Cook & Root
ATT'YS Patented Apr. 14, 1953

2,634,912

UNITED STATES PATENT OFFICE 2,634,912

SLIDE RULE INDICATOR

Clarence P. Davey, Oak Park, Ill., assignor to Eugene Dietzgen Co., Chicago, Ill., a corporation of Delaware Application May 1, 1951, Serial No. 223,960

14 Claims. (Cl. 235—70)

The present invention relates in general to slide rules and has more particular reference to indicators or runners for slide rules.

Slide rule calculators are commonly provided with runners comprising frames longitudinally adjustable on the slide rule and carrying a hair line, usually in the form of an etched line in a pane of glass carried by the runner, in position overlying the scale carrying surfaces of the slide rule.

An important object of the present invention is to provide an improved runner construction wherein the frame thereof is formed entirely of metal parts; a further object being to form the frame entirely of parts comprising inexpensive sheet metal stampings held together by fastening means such as screws and rivets which may be formed at low cost on screw machines.

Another important object is to provide a slide rule runner having a frame made entirely of inexpensive metal parts so formed and arranged as to avoid scratching of the surface of the rule as the result of adjustment of the runner therealong.

Another important object is to provide a runner of the character mentioned wherein the inherent resilience of a metal part thereof is utilized to mount a pane of glass or other transparent material in shock-proof fashion insuring the same against damage in the event that the frame be jarred or otherwise roughly treated as by the accidental dropping of the slide rule on which mounted.

Another important object is to provide a slide rule runner embodying end bar structures and a light weight sheet metal pane carrying frame removably and adjustably secured at its opposite ends on a spaced pair of said end bar structures, wherein each of said structures embodies pane supporting element and means preferably comprising a sheet metal stamping having resilient portions for yieldingly holding the frame and support element in position gently and resiliently pressing the fragile pane therebetween to hold the same in mounted position; a further object being to construct the end bar structures as an assembly of parts including the resilient holding element and a cover strip enclosing and secured to the element, and forming the pane supporting element, the cover strip being preferably of ornamental character and having portions presenting smooth sliding surfaces which face inwardly upon the edge of the slide rule; a further important object being to form the end edges of the pane carrying frame with dependent flanges in position to overlie and conceal the outer marginal edges of the bar structures.

Another important object is to form the end bar structures, at opposite ends of the runner of identical parts, in the interests of economy.

Another important object is to provide a runner construction which is compact and has appreciable strength and rigidity to support the pane and hair line thereon accurately in oriented position in the structure, and which also has sufficient resilience to protect the relatively fragile pane from damage when the slide rule is dropped or the pane mounting structure is accidentally jarred.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of a slide rule embodying the present invention;

Fig. 2 is a perspective view of the runner structure;

Fig. 3 is a perspective, exploded view of parts of the runner structure;

Fig. 4 is a sectional view taken substantially along the line 4—4 in Fig. 3;

Fig. 5 is a top elevation view of the runner, partially sectionalized;

Fig. 6 is an end view of the runner, partially sectionalized;

Figs. 7 and 8 are enlarged sectional views respectively taken substantially along the lines 7—7 and 8—8 in Fig. 5;

Figs. 9 and 10 respectively are a top and a front view of a pane supporting strip which forms a part of the runner structure; and Figs. 11 and 12 respectively are a top and a front view of a resilient holding element which forms a part of the runner structure.

To illustrate the invention the drawings show a slide rule 11, fitted with a runner 12 embodying the present invention. The slide rule shown comprises a pair of bars 13, secured together in spaced relationship as by means of spacing clips 14, at the opposite ends of the bars, and a slide member 15 supported by and between and longitudinally slidable with respect to the side bars 13. Suitable scales are carried on the faces of the members 13 and 15, the slide rule illustrated being of the double-faced sort having calculating scales engraved or otherwise formed on the opposite faces of the members 13 and 15. It will be obvious, of course, that the present invention is not necessarily limited to double-faced slide rules, although particularly well suited for use therewith; but the novel features of the invention, if desired, may be incorporated in runners for use in single face slide rules, of the Mannheim type, by appropriate modification.

As shown, however, the runner 12 comprises a pair of spaced end bar structures 16 adapted to register with, overlie and longitudinally traverse the outwardly facing edge surfaces of the slide rule bars 13, and a pair of frames 17 formed to support panes 18, of glass or other transparent material, each carrying a hair line 19, in position overlying the opposite scale carrying faces of the bars 13 and 15, the frames 17, at their opposite ends, being removably secured to the end bar structures 16.

The end bar structures 16 each comprise a fastening and support member 20 preferably formed as a sheet metal stamping providing a pair of spaced apart bars 21 and a connecting web 22 integral with and interconnecting the bars 21 medially thereof. Both of the bars 21 project outwardly at the opposite ends of the connecting web to provide spaced resilient fingers 23 at the opposite ends of the member 21, the bars being provided with notches 24 in the edges thereof, at the opposite ends of the web 22, to increase the flexibility of the fingers 23 with respect to the medial portions of the bars. The web is provided with a central perforation, and the web remote edges of the central portions of the bars 21 are provided with preferably rectangular notches 26. The fingers 23 may be and preferably are offset mutually inwardly, as at 27, between the web and the terminal ends of the fingers. The terminal ends of the fingers form spaced mounting lugs 28 having screw threaded openings 29 therein, at the opposite ends of the support member 20. The mounting lugs 28 and the openings 29 are in registering alinement at the opposite ends of the member.

Each bar structure also embodies a cover element 30 comprising a strip of sheet metal having a medial portion 31 and opposite end portions 32 bent inwardly on the medial portion to form curved ends 33 for the cover element, the medial portion 31 as well as the curved ends 33 being preferably formed, longitudinally thereof, with an outwardly offset, relatively wide bead or groove 34, for decorative purposes and to rigidify the same. The opposite end portions 32 of the cover strip extend mutually inwardly, to provide smooth flat surface portions 35 extending, at the opposite ends of the element 30, in parallel spaced relationship with respect to the medial portion 31 of the strip. These flat portions 35 form bearing surfaces in position to engage and ride on the edge surfaces of a slide rule on which the runner is mounted. Inwardly of the portions 35, the end portions 32 are disposed in position inclined toward the said medial portion, the terminal ends of said end portions being disposed opposite the mid-section of said medial portion and being bent to form terminal lips or lugs 36 offset inwardly toward the medial strip portion 31. The medial portion 31 of the strip is formed with a central opening or perforation 37 in alinement with respect to the space between the lugs 36.

The cover element 30 is secured to and is adapted to enclose the member 20, the parts being secured together as by means of a rivet 38 extending in the openings 25 and 37, and in notches 39 formed in the facing ends of the lugs 36 which are thus held in interfitting and interlocking engagement in the notches 26 of the support element 20. In one of the bar structures 16, the rivet 38 may be employed to secure the medial portions of a leaf spring 40 in the structure. This leaf spring may comprise a strip of spring metal having oppositely extending resilient arms supported in position overlying the inwardly inclined end portions 32 of the cover strip, that is to say, in position to resiliently engage and ride upon an outwardly facing edge surface of the slide rule.

It should be noted that the opposite edges of the cover strip, in the medial portion 31, the curved portions 33 and in the end portions 32 thereof are parallel and spaced apart a distance slightly greater than the distance between the outwardly facing surfaces of the bars 21 of the member 20. The said opposite edges may and preferably do taper inwardly toward the terminal ends of the portions 32, whereby said portions 32 include tapered portions 32′ disposed medially of the element 30 and flat untapered portions 32″ outwardly of said tapered portions and extending toward the opposite end portions 33 of the element.

The peripheral outline of the fingers 23, also, is slightly smaller than that of the space defined within the portion 31 and the portions 32 and 33 of the element 30 at the opposite ends thereof. Accordingly, when the parts are connected together the fingers 23 are free to flex resiliently within the cover element 30, which is fast on the member 20 only at the central binding rivet 38. The outwardly facing surfaces of the mounting lugs 28 also are disposed slightly within and behind the opposite edges of the cover member 30.

The pane carrying frames 17 each preferably comprises an integral sheet metal stamping providing a generally rectangular pane carrying portion, which portion comprises side bars 41 and end bars 42 integrally connected to form preferably rounded corners in said frame. The bars 41 and 42 are of angular sectional configuration respectively comprising an inwardly extending web 44, 44′ adapted to overlie the face of the pane 18, at the marginal edges thereof, and a dependent flange portion 45, 45′ adapted to snugly enclose the marginal edge surfaces of the pane 18. The dependent flange portions 45 of the side bars 41 are preferably slightly narrower than the thickness of the pane 18. The webs 44 of the side bars 41, also, are preferably substantially narrower than the webs 44′ of the end bars 42. The edges of the dependent portions 45′ of the end bars 42 are formed each with an outwardly extending flange 46, which flange preferably extends throughout the length of the bar portion 42 in offset relationship with respect to the inwardly extending pane retaining web 44′. The flanges 46 at their outer margins are each preferably provided with a downwardly extending lip 47 which may and preferably does have curved ends 48 at the opposite ends of the lip 47 and integrated with the correspondingly curved ends of the flange 46. The opposite ends of the flanges 46 are provided with perforations 49 spaced accurately for registration with the openings 29 at the opposite ends of the members 20 so that the members 17 may be attached and secured to the end bar structures 16 as by means of screws 50 extending in the openings 49 and having threaded engagement in the openings 29 of the end bar structures.

The window panes 18 are preferably formed at their marginal edges to fit snugly within the frame provided by the bars 41 and 42 so that, when the pane carrying frames are secured upon the bar structures 16, the pane may be held by and between the frame 17 and the seats formed by the untapered edge portions 32″ of the cover element 30. In this connection it will be seen that the panes 18 will rest at their corners, only, on the seats 32″, since the central portions of the end edges of the panes will extend opposite the inwardly tapered portions 32′ of the cover element. Since the fingers 23 are resilient, application of the screws 50 will serve to draw the frames 17 toward and press the panes 18 resiliently and gently on the seat forming edges of the cover element 30 substantially without danger of breakage, yet with adequate firmness to maintain a properly oriented position of the pane and its hair line in the runner. When the pane carrying frames are mounted and secured upon the end bars, by means of the holding elements 56, the dependent lips 47 and the rounded end portions 48 thereof, will overlie the opposite edges of the cover element 30 on opposite sides of the outward embossment 34, thereby closing the open sides of the cover elements and providing an attractive appearance in the end bar structures. If desired the exposed heads of the rivets 38 also may be of decorative character or otherwise formed to enhance the appearance of the device.

It will be seen from the foregoing that the present invention teaches the provision of an attractive inexpensive slide rule runner construction wherein all parts of the structure in engagement with the surfaces of the slide rule are of smooth free sliding character to thereby eliminate all possibility of scratching or otherwise marring the surfaces of the slide rule. The structure, moreover, affords resilient anchorage for securing the pane elements 18, thereby minimizing the danger of breakage thereof; and, because the structure comprises metal parts, it can be manufactured at low cost. The structure furthermore, is immune to shrinkage, warping and other forms of deterioration encountered in conventional runners embodying other materials than metal in the runner frame.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A slide rule runner comprising an end bar structure and a frame for supporting and securing a transparent pane thereon, said frame comprising an integral sheet metal stamping having a rim of angular sectional configuration adapted to snugly receive the edges of the pane and to overlie the face of the pane at the edges thereof, and means to secure the frame in resiliently yielding fashion on said end bar structure.

2. A slide rule runner comprising an end bar structure and a frame for supporting and securing a transparent pane thereon, said pane carrying frame comprising a sheet metal stamping having a rim formed to snugly receive the edges of the pane and an outstanding integral flange at an end thereof in position to overlie one side of said bar structure, and resilient means to secure said flanges on said bar structure.

3. A slide rule runner comprising an end bar structure and a frame for supporting and securing a transparent pane thereon, said pane carrying frame comprising a sheet metal stamping having a rim formed to snugly receive the edges of the pane and an outstanding integral flange at an end thereof in position to overlie one side of said bar structure, and means to secure said flange in resiliently yielding fashion to said bar structure, the marginal edge of said outstanding flange having a dependent lip adapted to overlie and conceal the edge of said bar structure.

4. A slide rule runner comprising an end bar structure and a frame for supporting and securing a transparent pane thereon, said end bar structure providing a mounting seat for an edge of the pane and a resilient anchorage portion and means to secure said frame, at its end on said resilient portion of said bar structure, to thereby resiliently hold the pane on said seat.

5. A slide rule runner comprising an end bar structure forming a seat and an adjacent resilient mounting portion, a frame for receiving and supporting a transparent pane with an edge portion thereof in engagement with said seat, and means for securing said frame to said resilient mounting portion whereby resiliently to hold the pane on said seat.

6. A slide rule runner comprising an end bar structure forming a seat and an adjacent resilient mounting portion, a frame for receiving and supporting a transparent pane with an edge portion thereof in engagement with said seat, and removable fastener means for detachably securing said frame on said resilient mounting portion, whereby to apply the resilience of said mounting portion to resiliently hold the pane on said seat.

7. A slide rule runner comprising an end bar structure and a frame for supporting and securing a transparent pane thereon, said end bar structure providing a mounting seat for an edge of the pane, and a resilient anchorage portion, said pane carrying frame comprising an integral sheet metal stamping having an outstanding integral flange at an end thereof in position to overlie one side of said bar structure, and means for detachably securing the outstanding flange to said resilient anchorage portion of said bar structure.

8. A slide rule runner comprising an end bar structure and a frame for supporting and securing a transparent pane thereon, said end bar structure providing a mounting seat for an edge of the pane, and a resilient anchorage portion, said pane carrying frame comprising an integral sheet metal stamping having an outstanding integral flange at an end thereof in position to overlie one side of said bar structure, and means for detachably securing the outstanding flange to said resilient anchorage portion of said bar structure, the outstanding flange of the frame having a dependent marginal lip formed thereon in position to overlie and conceal the outer edge of the bar structure.

9. A slide rule runner comprising an end bar structure and a frame for supporting and securing a transparent pane thereon, said end bar structure comprising a hollow element forming a seat for an edge of said pane, resilient anchorage means mounted within said element, and means to secure said frame on said resilient anchorage means in position holding said pane on said seat.

10. A slide rule runner comprising an end bar structure and a pair of frames for supporting and securing each a transparent pane on the opposite sides of the bar structure, said end bar structure comprising interconnected sheet metal parts including a mounting element forming a pair of spaced bars, providing resilient spaced fingers at the opposite ends of the element, a cover element comprising a sheet metal strip mounted on and enclosing said element, including said fingers and the space therebetween, said strip providing oppositely facing pane seats at the opposite sides of the bar structure, and means to secure said frames each on a pair of said resilient fingers of said bar structure.

11. A slide rule runner comprising a pair of end bar structures and a pair of frames for interconnecting the end bar structures in spaced relation, and for supporting and securing each a transparent pane thereon, said pane carrying frames each comprising an integral sheet metal stamping having a rim formed to snugly receive the edges of the pane and outstanding integral flanges at the opposite ends thereof in position to overlie one side of each of said bar structures, the marginal edges of said outstanding flanges each having a dependent lip formed in position to overlie and conceal an outer edge of a bar structure, and resilient means for detachably securing the outstanding flanges, at the opposite ends thereof, each to a said bar structure.

12. A slide rule runner comprising a pair of end bar structures and a pair of frames for interconnecting the end bar structures in spaced relation, and for supporting and securing each a transparent pane thereon, each of said end bar structures comprising interconnected metal parts including a mounting element forming a pair of spaced bars, an integral spacing web medially interconnecting said spaced bars, said bars having edge notches to provide resilient spaced fingers at the opposite ends of the element, a cover element comprising a sheet metal strip mounted on and enclosing said element, including said fingers and the space therebetween, said cover element forming oppositely facing seats for said panes, being medially riveted on said spacing web, and having end portions providing smooth rule edge engaging surfaces, lugs on said end portions interlockingly engaged with said support element, and means to secure said frames, at the opposite ends thereof, on said resilient fingers of said bar structures.

13. A slide rule runner comprising a pair of end bar structures and a pair of frames for interconnecting the end bar structures in spaced relation, and for supporting and securing each a transparent pane thereon, each of said end bar structures comprising interconnected sheet metal parts including a mounting element forming oppositely extending resilient fingers, a cover element comprising a sheet metal strip mounted on and enclosing said mounting element, said cover element being medially secured on said mounting element, and having portions providing smooth rule edge engaging surfaces, said cover element having portions forming spaced seats for said panes, and means to secure said frames, each at its opposite ends on said resilient fingers of said bar structures, to draw the panes onto and resiliently hold the same against said seats.

14. A slide rule runner comprising a pair of end bar structures and a pair of frames for interconnecting the end bar structures in spaced relation, and for supporting and securing each a transparent pane thereon, each of said end bar structures comprising interconnected sheet metal parts including a mounting element providing a central web and resilient fingers on and extending oppositely from said web, a seat forming element comprising a sheet metal strip mounted on and enclosing said mounting element, including said fingers, said seat forming element having edges forming seats for the panes, being medially secured on said spacing web, and having portions providing smooth rule edge engaging surfaces, a leaf spring secured in a said end structure in position overlying the rule edge engaging surfaces thereof, said pane carrying frames each comprising an integral sheet metal stamping having a rim of angular sectional configuration adapted to snugly receive the edges of a pane, each said frame having outstanding integral flanges at the opposite ends thereof in position to overlie one side of each of said bar structures, the marginal edges of said outstanding flanges having each a dependent lip formed in position to overlie and conceal an outer edge of a said seat forming element, and means for detachably securing said outstanding flanges, at the opposite ends thereof, to said resilient fingers.

CLARENCE P. DAVEY.

References Cited in the file of this patent

UNITED STATES PATENTS

| Number | Name | Date |
|---|---|---|
| 1,594,385 | Strauss | Aug. 3, 1926 |
| 2,086,502 | Keuffel | July 6, 1937 |
| 2,136,169 | Keuffel | Nov. 8, 1938 |